United States Patent
Smith et al.

[11] Patent Number: 5,845,729
[45] Date of Patent: Dec. 8, 1998

[54] LOGIC LEVEL ARMING SENSOR FOR SUPPLEMENTAL INFLATABLE RESTRAINT

[75] Inventors: Robert Bradley Smith; Kevin Dale Kincaid, both of Kokomo, Ind.

[73] Assignee: Delco Electronics Corp., Kokomo, Ind.

[21] Appl. No.: 762,462

[22] Filed: Dec. 9, 1996

[51] Int. Cl.$^6$ .................................................. B60R 21/32
[52] U.S. Cl. ...................... 180/282; 280/735; 307/10.1; 340/436; 200/61.53
[58] Field of Search ................................. 280/735, 734; 180/282, 274; 307/10.1; 340/436, 438, 669; 701/45; 200/61.53, 61.45 R

[56] References Cited

U.S. PATENT DOCUMENTS

| | | |
|---|---|---|
| 3,132,221 | 5/1964 | Kachline et al. ................... 200/61.53 |
| 3,300,603 | 1/1967 | Wakely ........................... 200/61.45 R |
| 5,083,276 | 1/1992 | Okano et al. ........................... 280/735 |
| 5,208,484 | 5/1993 | Okano et al. ........................... 280/735 |
| 5,657,831 | 8/1997 | Furui ..................................... 280/735 |

*Primary Examiner*—Peter C. English
*Attorney, Agent, or Firm*—Mark A. Navarre

[57] ABSTRACT

An SIR has an AND gate for selectively passing a deployment signal from a deployment circuit to a firing circuit. An arming circuit includes a logic circuit containing a small normally closed arming sensor which disables the AND gate until a prescribed acceleration level occurs to open the arming sensor. A pulse stretcher ensures that if the sensor opens only briefly, the AND gate will remain enabled long enough to complete deployment. The arming sensor comprises a plastic housing with a cylindrical cavity, terminals closing opposite ends of the cavity, and a spring biased mass in the cavity which electrically connects the terminals until an acceleration moves the mass to break the connection.

7 Claims, 3 Drawing Sheets

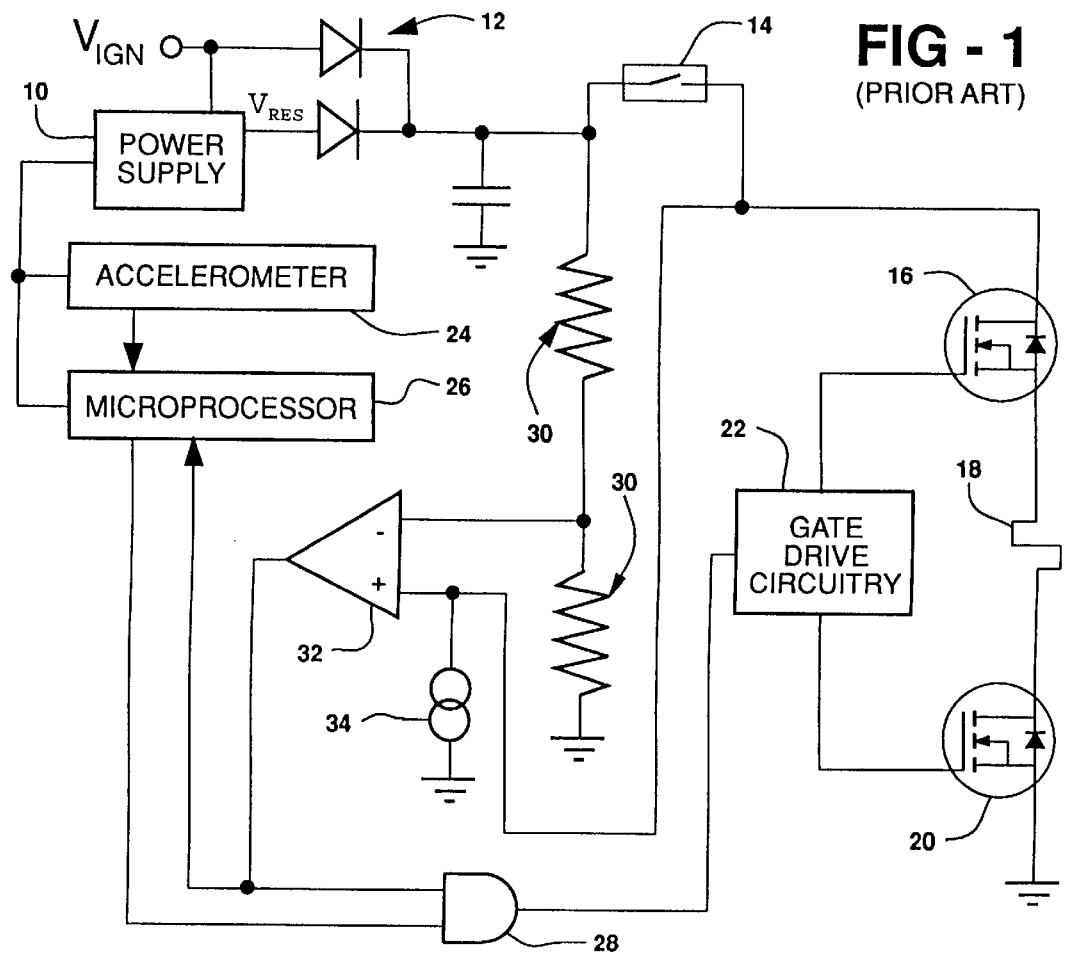
FIG - 1
(PRIOR ART)
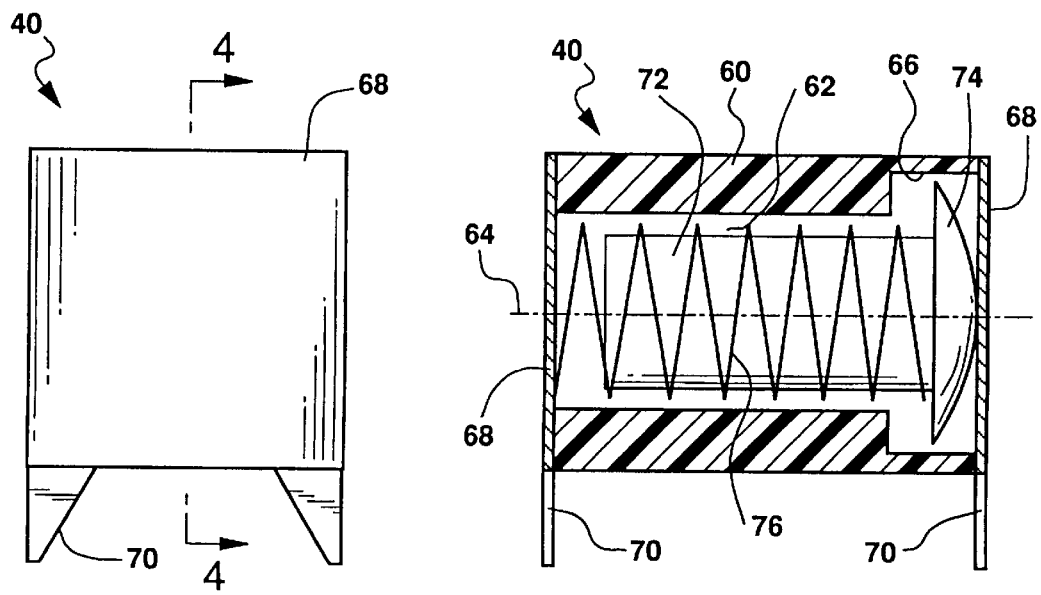
FIG - 3   FIG - 4

LOGIC LEVEL ARMING SENSOR FOR SUPPLEMENTAL INFLATABLE RESTRAINT

FIELD OF THE INVENTION

This invention relates to a supplemental inflatable restraint (SIR) system and particularly to an SIR arming sensor.

BACKGROUND OF THE INVENTION

Supplemental inflatable restraint (SIR) systems for automotive vehicles generally employ a firing circuit having a firing element called a squib or initiator for causing inflation of an air bag, and a deployment circuit having an accelerometer sensitive to vehicle motion, especially deceleration, and a microprocessor monitoring the accelerometer output for evaluating the severity of a crash to determine whether to deploy the air bag. The vehicle battery or ignition system voltage empowers the deployment circuit and the firing circuit. The deployment circuit and the firing circuit are to a large extent carried out by a microprocessor on an integrated circuit chip, and an external harness leads to the squib or initiator at the site of each air bag.

To guard against deployment due to electronic failure, an arming circuit is used to disable the firing circuit until an arming sensor, separate from the accelerometer in the deployment circuit detects a high deceleration signifying a potential crash. Typically this is accomplished by a sensor switch in series with the firing circuit and the high voltage power supply which is normally open and closes only when high deceleration is detected.

A typical system of this kind is shown in FIG. 1. A power supply 10 coupled to vehicle ignition voltage $V_{IGN}$ produces a reserve voltage $V_{RES}$ which may be about 23 volts. The firing circuit comprises diodes 12 coupling both of those voltages to a normally open arming sensor 14 which is in series with a high side FET 16, the initiator or squib 18 and a low side FET 20. Gate drive circuitry 22 is connected to the FET gates to turn on the FETs when activated. The arming sensor often employs a reed switch and is responsive to a prescribed level of acceleration to close the switch. The power supply also supplies a logic level voltage which is typically about 5 volts to the deployment circuit comprising an accelerometer 24 and a microprocessor 26 which is programmed to evaluate the sensed acceleration and determine whether to issue a deployment signal. The microprocessor deployment output is coupled through an AND gate 28 or arming gate to the gate drive circuitry 22 which can turn on the FETs 16, 20. The voltage input to the arming sensor 14 is coupled through a voltage divider 30 to the negative input of a comparator 32. The output side of the arming sensor 14 is connected to the positive input of the comparator and through a current sink 34 to ground. The comparator 32 output comprises an arming sensor status signal and is connected to an input of the AND gate 28 as well as to a port of the microprocessor which monitors the sensor status. In operation, when the sensor 14 is open a high voltage is applied to the negative input of the comparator 32 and the current sink 34 ensures that the positive input voltage will be low. The arming sensor 14 is normally open so that firing current is blocked from the FETs, and the comparator 32 output will be low to block AND gate conduction of any deployment signal from the microprocessor. Upon detecting the prescribed acceleration, the arming sensor switch will close to apply high voltage to the FET 16 and to the positive input of the comparator to enable the AND gate 28. Thus if the deployment signal is applied to the gate 28 the drive circuitry 22 will be activated to turn on the FETs and apply firing current to the initiator 18.

It will be apparent that the arming sensor switch must be able to accommodate the several amps required to fire the initiator; this in turn mandates a large and expensive arming sensor. Also the arming sensor must be designed to remain closed long enough to fire the initiator. Further, since the arming sensor switch is normally open, there is no convenient way to test the circuit to determine that the sensor is properly connected in the circuit. Such testing, however, is important, along with other diagnostic tests, to ensure the integrity of the SIR system.

SUMMARY OF THE INVENTION

It is therefore an object of the invention to minimize the size and cost of an arming sensor for a SIR firing circuit. It is another object to employ a normally closed arming sensor in such a circuit to permit diagnostic testing of the switch connection in the circuit.

A firing circuit is connected directly to the power supply so that the high voltage is always connected to an FET circuit for initiator deployment when the FETs are switched on. A low voltage logic circuit containing an arming sensor is connected to one input of an AND gate and a deployment circuit is connected to another input of the AND gate; the gate enables the FET circuit via drive circuitry when both inputs are high. The arming sensor is a normally closed switch and a signal processing circuit between the sensor and the gate supplies a high input to the gate when the switch opens. A pulse stretcher in the signal processing circuit ensures that the FET circuit is enabled long enough to complete the deployment even though the arming sensor may be open only briefly.

The arming sensor comprises an insulating body having an axial cavity with an electrical terminal closing each end of the cavity, and a spring biased conductive mass slidably disposed in the cavity is urged against a terminal to close the switch and separates from the terminal under the influence of an acceleration of the prescribed amount to open the switch. Since the arming sensor is exposed to low voltage and current it can be small and inexpensive.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic diagram of a SIR electrical system according to the prior art;

FIG. 2 is a schematic diagram of a SIR electrical system according to the invention;

FIG. 2a is a schematic diagram of a SIR electrical system showing a modification of the FIG. 2 system according to the invention;

FIG. 3 is an end view of an arming sensor according to the invention;

FIG. 4 is a cross-sectional view of the arming sensor taken along line 4—4 of FIG. 3.

DESCRIPTION OF THE INVENTION

Figures 2, 2A:
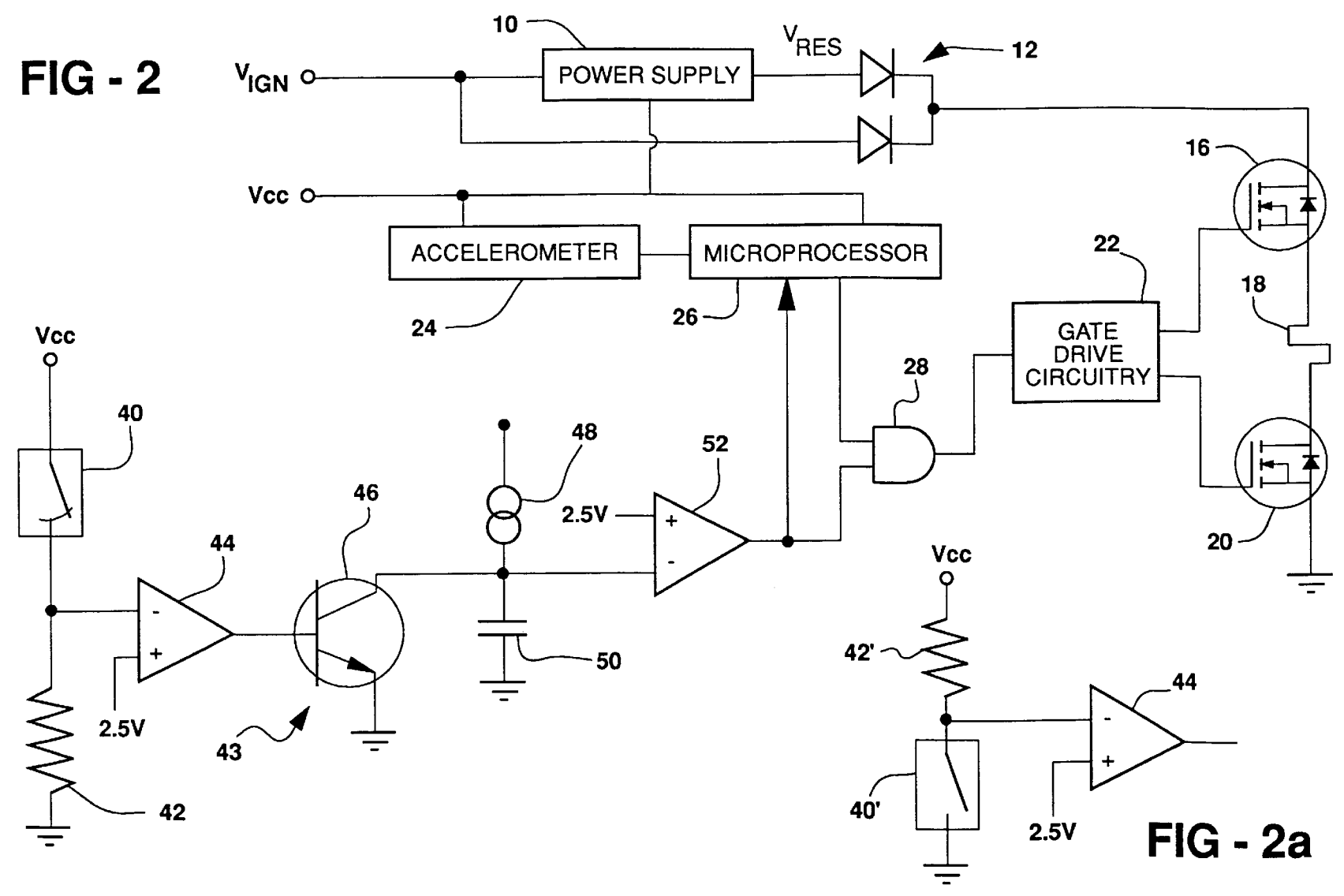
Figure 5:
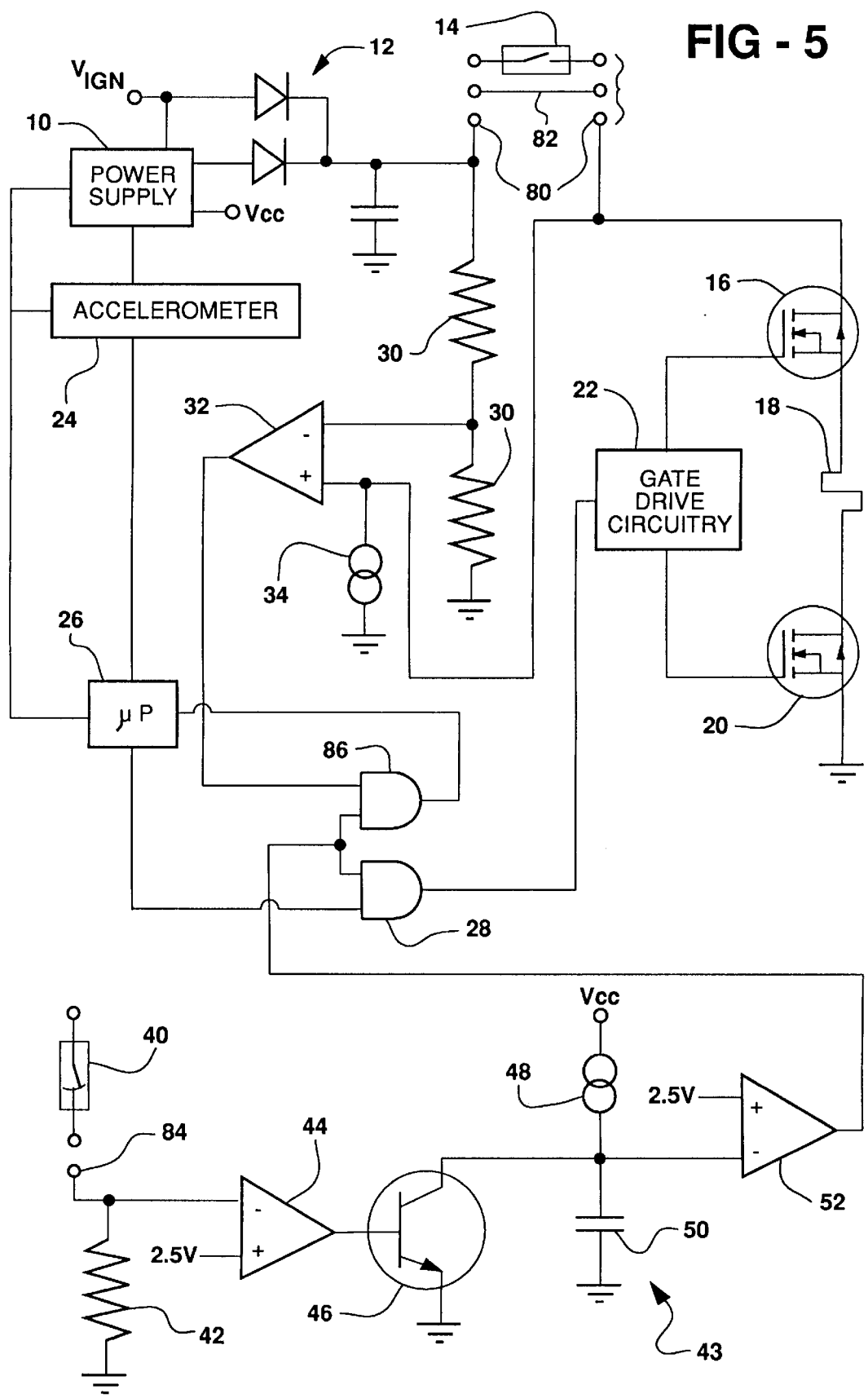
FIG. 5 is a schematic diagram of a SIR electrical system according to another embodiment of the invention.

Referring to FIG. 2, a power supply 10 coupled to vehicle ignition voltage $V_{IGN}$ produces a reserve voltage $V_{RES}$ which may be about 23 volts. Diodes 12 couple both of those voltages to a firing circuit comprising a high side FET 16, the initiator or squib 18 in series with a low side FET 20, and gate drive circuitry 22 coupled to the FET gates. The power supply also supplies a logic level voltage $V_{CC}$ which is typically about 5 volts to the deployment circuit comprising an accelerometer 24 and a microprocessor 26 which is programmed to evaluate the sensed acceleration and determine whether to issue a deployment signal. The microprocessor deployment output is coupled through an AND gate 28 to the gate drive circuitry 22 which can turn on the FETs 16, 20 to fire the initiator.

An arming sensor 40 is coupled at one side to the logic level voltage $V_{CC}$ and at the other side through a resistor 42 to ground. A signal processing circuit 43 couples the arming sensor 40 to the AND gate 28 to enable or inhibit the deployment signal. The arming circuit includes the sensor 40, the signal processing circuit 43 and the AND gate 28. The sensor-resistor junction is connected to the negative input of a first comparator 44 which has its positive input fixed at a reference voltage of 2.5 volts. The comparator output is coupled to the base of an NPN transistor 46 having a grounded emitter. A current source 48 is connected from $V_{CC}$ to the collector and a capacitor 50 couples the collector to ground. The collector is connected to the negative input of a second comparator 52 which also has its positive input fixed at a reference voltage of 2.5 volts. The comparator 52 output is connected to an input of the AND gate 28.

Normally the arming sensor 40 is closed so that the first comparator 44 output is low, the collector is high, and the comparator 52 output is low to disable the gate 28. Then if a deployment signal is received from the microprocessor 26, the drive circuitry 22 will not be actuated. However the arming sensor is set to a prescribed acceleration, say, 14 g, and if such acceleration is detected, the sensor will open causing the first comparator 44 output to go high, turning on the transistor 46 to quickly discharge the capacitor 50 to cause the second comparator 52 output to go high, enabling the AND gate 28 and allowing the FETs to be turned on for deployment if the deployment signal is present.

The transistor 46, the capacitor 50 and the current source 48 comprise a pulse stretcher. When the arming sensor 40 closes the transistor 46 will turn off allowing the current source 48 to slowly charge the capacitor so that the comparator 52 will switch to a low state only after a predetermined time. This ensures that even if the arming sensor is open only briefly, the AND gate will be enabled long enough to complete the deployment.

The second comparator 52 output comprises an arming sensor status signal and is coupled to a port of the microprocessor 26 which monitors the status. The status signal is also used as a diagnostic signal. The microprocessor is programmed to monitor the signal during a period of low acceleration when the arming switch will surely be closed. When the diagnostic signal is low the arming switch output is normal and is deemed to be properly connected in the circuit. However, if during the monitoring period the diagnostic signal is high, the arming switch must be defective or not properly connected in the circuit, and the microprocessor will issue a warning signal.

FIG. 2a shows a modification of the FIG. 2 circuit wherein the arming sensor 40' is a normally open sensor and is coupled at one side to ground and at the other side through a resistor 42' to the logic level voltage $V_{CC}$. As in FIG. 2, the sensor-resistor junction is connected to the negative input of a first comparator 44. The operation is the same as the FIG. 2 circuit: normally $V_{CC}$ is applied to the comparator and when the normally open sensor 40' changes state (closes) it is armed and thus applies a ground potential to the comparator 44.

As shown in FIGS. 3 and 4 the normally closed arming sensor 40 comprises an insulating housing 60 of plastic having a cylindrical cavity 62 defining a longitudinal axis 64, and a counterbore 66 at one end. Electrical terminals 68 comprise end plates which close the cavity and have depending legs 70 for connection to a circuit board. A cylindrical conductive mass 72 is axially movable in the cavity 62 and has an enlarged head 74 residing in the counterbore 66. A coil spring 76 surrounding the mass 72 bears on one terminal 68 at one end and on the head 74 at the other end to push the head against the other terminal. Thus the spring and mass normally complete a circuit between the two terminals; when, however, acceleration along the axis 64 is sufficient to move the mass away from the terminal at the head end, the circuit is broken to open the sensor. The sensor characteristics are selected by choosing appropriate spring rate, preload force and mass. The sensor is easily made very small, for example, the axial length is preferred to be one half inch and the mass is 3/16 inch diameter and 3/8 inch long, or the device may be smaller.

In some vehicle applications it is preferred to use the conventional normally open series arming sensor depicted in FIG. 1 instead of the inexpensive and compact logic level arming sensor depicted in FIG. 2. Rather than produce two separate circuits as shown in the respective figures, it is desirable to produce one circuit which can be used with either sensor. FIG. 5 reveals such a circuit. The circuit components which are the same as in FIGS. 1 and 2 bear the same reference numerals in FIG. 5. The cathode side of the diodes 12 and the high side of the FET 16 are provided with terminals 80 which are bridged by either a normally open arming sensor 14 or by a conductive link 82. The junction of resistor 42 and comparator 44 is provided with a terminal 84. When the link 82 is connected to terminals 80, the normally closed arming sensor 40 is attached to the terminal 84 as well as to $V_{CC}$. When, however, the sensor 14 is connected to terminals 80, the terminal 84 remains open. Thus only one arming sensor is in the circuit. The output of comparators 32 and 52 are connected the input of an AND gate or status gate 86 forming a status circuit. The gate output reflects arming sensor status and is connected to a microprocessor port. The arming AND gate 28 has its inputs connected to the comparator 52 output to selectively enable the gate and to the deployment signal output of the microprocessor.

In practice, with the normally open sensor 14 connected to terminals 80 and the terminal 84 remaining open, the comparator 52 output will remain high to continuously enable the arming gate 28 so that any deployment signal from the microprocessor will be applied to the drive circuitry 22. The normally open arming sensor 14 will supply firing current to the firing circuit only when a prescribed acceleration is sensed. The comparator 32 output will normally be low except when the arming sensor closes; the status gate 86 will be continuously enabled and its output will be high only when the arming sensor 14 closes.

With the link 82 bridging the terminals to supply voltage to the FET 16 and the normally closed arming sensor 40 connected to the terminal 84, the comparator 52 output will normally be low to hold the outputs of gates 28 and 86 low, thereby sending a low status signal to the microprocessor and blocking any deployment signal from the microprocessor. Due to the link 82 the comparator 32 output will be held high to continuously enable the status gate 86. When the arming sensor 40 experiences a high acceleration it will open to force the comparator 52 output high to enable the arming gate 28 to pass any deployment signal, and to drive the status gate 86 high to apprise the microprocessor of the opening of the sensor 40. As in FIG. 2 the signal processing circuit 43 includes a pulse stretcher to ensure that the gate 28 remains enabled long enough for the deployment signal to fully activate the initiator 18. Thus the same circuit can be used for either the normally open or the normally closed sensor.

It will be seen that the use of a small inexpensive normally closed arming sensor in a simple circuit operating at a logic voltage and current level affords a complete arming function which not only has an economic advantage but also allows diagnosis for a missing or improperly connected sensor. It will further be seen that a hybrid circuit accepting either a normally open or a normally closed arming sensor affords the additional economy resulting from the manufacture and inventory of a single circuit design for either application.

The embodiments of the invention in which an exclusive property or privilege is claimed are defined as follows:

1. In a supplemental inflatable restraint system including an arming circuit, a deployment circuit and a firing circuit connected directly to a power supply, the arming circuit including:

a normally disabled gate for connecting the deployment circuit to the firing circuit when enabled;

a normally closed mechanical logic level arming sensor subject to changing to an open state at a prescribed vehicle acceleration which is potentially indicative of a crash;

a signal processing circuit connected between the arming sensor and the gate, and having an output for enabling the gate to arm the firing circuit when the arming sensor changes to an open state; and diagnostic means for using the output of the signal processing circuit as a diagnostic signal during a monitoring period of low acceleration in order to verify proper connection of the arming sensor to the signal processing circuit.

2. In a supplemental inflatable restraint system including an arming circuit, a deployment circuit and a firing circuit connected directly to a power supply, the arming circuit including:

a normally disabled gate for connecting the deployment circuit to the firing circuit when enabled;

a mechanical logic level arming sensor subject to changing state at a prescribed vehicle acceleration which is potentially indicative of a crash, said mechanical logic level arming sensor including an insulating housing having a cylindrical cavity defining a longitudinal axis; conductive end plates at opposite ends of the cavity comprising output terminals; a conductive mass axially movable within the cavity and subject to acceleration along the axis; and a spring seated on one end plate and pushing the mass toward the other end plate with a preload force to normally conductively connect the end plates whereby the sensor is normally closed, the preload force of the spring being selected to yield at the prescribed acceleration whereby the mass moves away from said other end plate to open the sensor; and a signal processing circuit coupled between the arming sensor and the gate for enabling the gate to arm the firing circuit when the arming sensor changes state.

3. The invention as defined in claim 2 wherein:

the spring is a coil spring; and the mass has a cylindrical body residing within the coil spring and has an enlarged head for engaging an end of the spring.

4. In a supplemental inflatable restraint system including an arming circuit, a deployment circuit and a firing circuit, the arming circuit being capable of operation with either a logic level normally closed arming sensor or a normally open arming sensor in series with the firing circuit and including:

a first sensor location between a power supply and the firing circuit adapted to selectively receive either the normally open arming sensor or a link in series with the power supply and the firing circuit;

an arming gate for selectively coupling the deployment circuit to the firing circuit; and a signal processing circuit having a second sensor location adapted to selectively receive the normally closed arming sensor and coupled to the arming gate for enabling the arming gate when the normally closed arming sensor is either absent or open.

5. The invention as defined in claim 4 wherein the signal processing circuit includes a pulse stretcher to ensure arming of the firing circuit for a sufficient time for deployment when the normally closed arming sensor opens.

6. The invention as defined in claim 4 including a status circuit coupled to the first sensor location for producing a sensor status signal when the normally open arming sensor is present and coupled to the signal processing circuit for producing a sensor status signal when the normally closed arming sensor is present.

7. The invention as defined in claim 4 including:

a status circuit coupled to the first sensor location for detecting the status of the normally open sensor when present;

an AND gate coupled to the signal processing circuit and to the status circuit for producing a sensor status signal;

the status circuit producing an AND gate enabling signal when the link is connected to the first sensor location, whereby the status signal reflects the status of the normally closed sensor, and the signal processing circuit producing an AND gate enabling signal when the normally closed sensor is absent, whereby the status signal reflects the status of the normally open sensor.

* * * * *